United States Patent [19]

Fujii

[11] Patent Number: 4,907,416
[45] Date of Patent: Mar. 13, 1990

[54] AIR-CONDITIONER FOR AUTOMOBILES
[75] Inventor: Kazuo Fujii, Konan, Japan
[73] Assignee: Diesel Kiki Co., Ltd., Tokyo, Japan
[21] Appl. No.: 358,613
[22] Filed: May 30, 1989
[30] Foreign Application Priority Data
Jun. 21, 1988 [JP] Japan ................... 63-153323
[51] Int. Cl.⁴ ............................................. F25B 1/00
[52] U.S. Cl. ...................................... 62/180; 62/209;
62/228.5
[58] Field of Search ................... 62/180, 228.4, 228.5,
62/209, 229

[56] References Cited
U.S. PATENT DOCUMENTS
4,507,932 4/1985 Suzuki et al. ...................... 62/180
4,582,124 4/1986 Yoshimi et al. .................. 62/229 X
4,748,819 6/1988 Takahashi ..................... 62/228.5 X
4,815,300 3/1989 Suzuki ................................. 62/209

Primary Examiner—William E. Wayner
Attorney, Agent, or Firm—Wenderoth, Lind & Ponack

[57] ABSTRACT

An automobile air-conditioner of the type having a variable displacement compressor, wherein a desired degree to which an evaporator is cooled is calculated by a desired cooling degree calculation means, and a desired rotational speed of a blower is calculated by a desired rotational speed calculation means. The results of calculation by both of the calculation means are used for controlling the displacement of the variable displacement compressor. Thus, the displacement of the compressor is corrected in immediate response to a change of thermal loads.

3 Claims, 5 Drawing Sheets

AIR-CONDITIONER FOR AUTOMOBILES

BACKGROUND OF THE INVENTION

1. Field of the Invention

The present invention relates generally to an air-conditioner for automobiles, and more particularly to an improvement in a control system for controlling the displacement of a compressor provided in a refrigeration cycle or system of the automobile air-conditioner.

2. Description of the Prior Art

There are known automatically controlled automobile air-conditioners of the type wherein the displacement of a compressor is controlled by a thermal load on the vehicle compartment which is calculated in the form of a total signal based on a setting temperature, a vehicle compartment temperature, and a temperature outside the vehicle compartment. The prior automobile air-conditioners have a drawback that the temperature of air passed through an evaporator cannot be maintained at a constant value due to a change in temperature of intake air or a change in amount of air supplied from a blower. Consequently, an accurate control of the vehicle compartment temperature is difficult to achieve.

With the foregoing drawback in view, an attempt has been proposed such as disclosed in Japanese Pat. Laid-open Publication No. 62-94748, for example, wherein the degree to which the evaporator is cooled is detected and the thus detected degree of cooling of the evaporator is used in combination with the total signal stated above for correcting the displacement of the compressor.

This correction of the displacement of the compressor is effected after detection of a change in the degree of cooling of the evaporator and not in coincidence with a change in temperature of intake air or a change in amount of air supplied from the blower based on which the degree of cooling of the evaporator varies. Consequently, an unpleasant temperature change is produced due to a delay in correction of the displacement of the compressor. Thus, the prior control system only has a limited accuracy in controlling the temperature of air discharged into the vehicle compartment.

SUMMARY OF THE INVENTION

It is accordingly an object of the present invention to provide an air-conditioner for automobiles which is capable of correcting the displacement of a compressor in immediate response to a change in the degree of cooling of an evaporator.

According to the present invention, there is provided an air-conditioner for an automobile, comprising: a refrigeration cycle including an evaporator through which intake air is forced to pass, and a compressor adapted to be driven by an engine of the automobile; an intake air temperature sensor for detecting the temperature of intake air before being passed through the evaporator; displacement adjustment means for regulating the displacement of the compressor; desired discharge temperature calculation means for calculating a desired temperature of air discharged into a vehicle compartment of the automobile based on the outputs from at least a temperature setter and a vehicle compartment temperature sensor: desired cooling degree calculation means for calculating a desired degree of cooling of the evaporator based on the result of calculation by the desired discharge temperature calculation means; desired rotational speed calculation means for calculating a desired rotational speed of a blower based on the result of calculation by the desired discharge temperature calculation means; and control means for calculating an amount of adjustment of the displacement adjustment means based on the output from the intake air temperature sensor, the result of calculation by the desired cooling degree calculation means and the result of calculation by the desired rotational speed calculation means.

With this construction, the amount of adjustment of the displacement adjustment means is determined depending on the temperature of air before it flows through the evaporator, the desired cooling degree of the evaporator, and the desired rotational speed of the blower, so that the displacement of the compressor is regulated in immediate response to a change in thermal load on the evaporator without the need for measurement of the degree to which the evaporator is currently cooled.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

The present invention will be described herein below in greater detail with reference to a preferred embodiment shown in the accompanying drawings.

Figure 1:
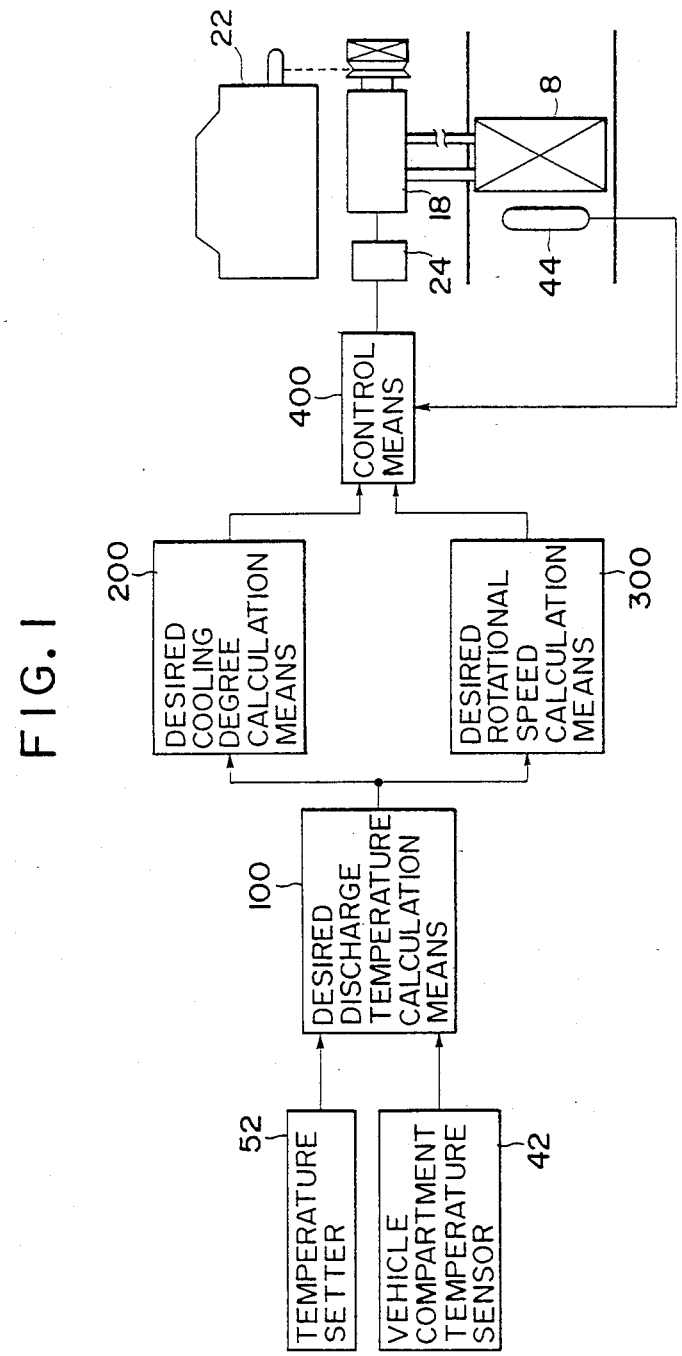
FIG. 1 is a block diagram showing the general construction of an air-conditioner for an automobile according to the present invention.

As generally shown in FIG. 1, an air-conditioner for an automobile according to the present invention comprises a refrigeration cycle including an evaporator 8 through which intake air is forced to pass, and a compressor 18 adapted to be driven by an engine 22 of the automobile; an intake air temperature sensor 44 for detecting the temperature of intake air before being passed through the evaporator 8; displacement adjustment means 24 for regulating the displacement of the compressor 18; desired discharge temperature calculation means 100 for calculating a desired temperature of air discharged into a vehicle compartment of the automobile based on the outputs from at least a temperature setter 52 and a vehicle compartment temperature sensor 42: desired cooling degree calculation means 200 for calculating a desired degree of cooling of the evaporator 8 based on the result of calculation by the desired discharge temperature calculation means 100; desired rotational speed calculation means 300 for calculating a desired rotational speed of a blower based on the result of calculation by the desired discharge temperature calculation means 100; and control means 400 for calculating an amount of adjustment of the displacement adjustment means 24 based on the output from the intake air temperature sensor 44, the result of calculation by the desired cooling degree calculation means 200 and the result of calculation by the desired rotational speed calculation means 300.

Figure 2:
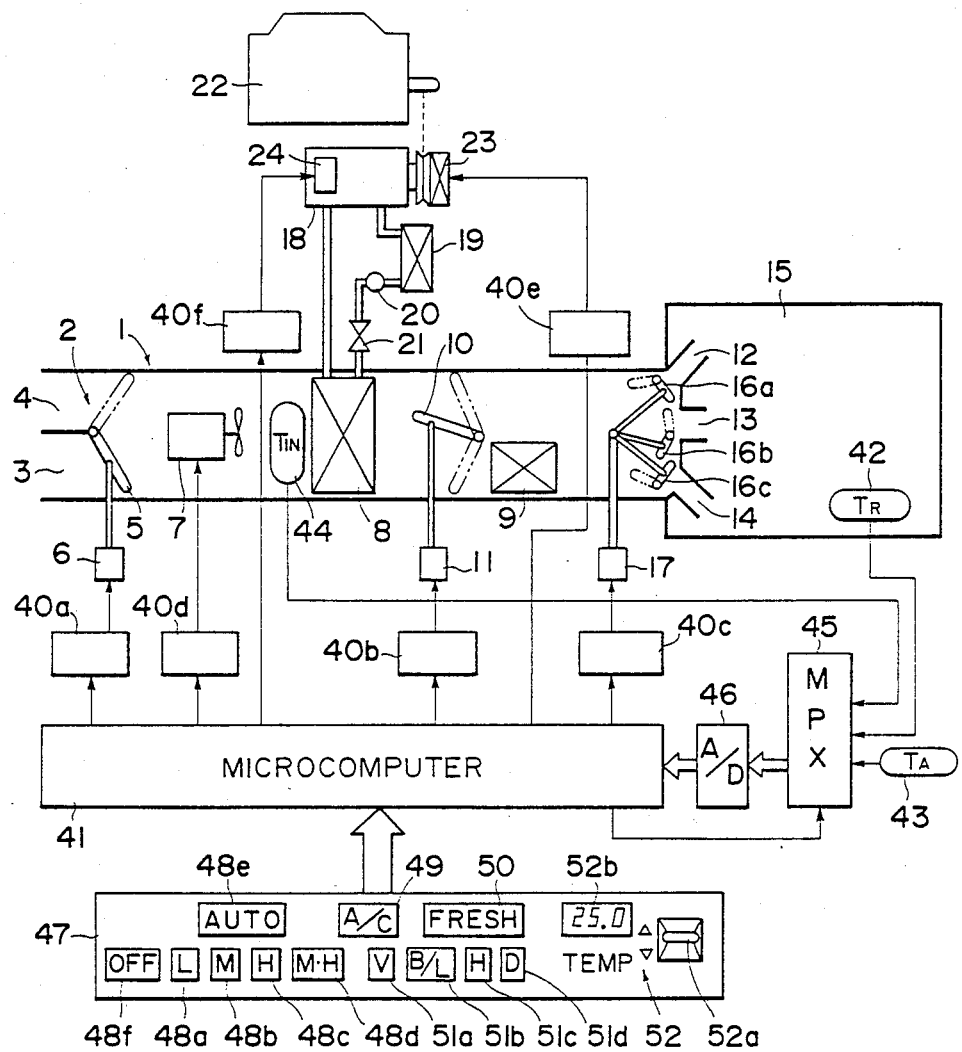
FIG. 2 is a diagrammatical view illustrative of the structural details of the automobile air-conditioner.

FIG. 2 shows structural details of the automobile air-conditioner shown in FIG. 1. The automobile air-conditioner includes an air-flow duct 1 having an intake door changeover device 2 at the upstream end thereof. The intake door changeover device 2 includes a selecting door 5 disposed at the junction between a recirculated air inlet 3 and an outside air inlet 4 that are provided in bifurcated fashion. The selecting door 5 is operatively connected to an actuator 6 and driven by the latter to select one of the inlets 3, 4 for allowing the recirculated air or the outside air to be drawn into the duct 1.

A blower 7 is disposed in the duct 1 immediately downstream of the changeover device 2 to force the air to flow downstream through the duct 1. The duct 1 also includes the evaporator 8 and a heater core 9 disposed downstream of the blower 7 in the order named.

An air-mix door 10 is disposed between the evaporator 8 and the heater core 9 and operatively connected to an actuator 11. The opening of the air-mix door 10 is regulated by the actuator 11 for adjustably changing the ratio of the amount of air flowing directly through the heater core 9 to the amount of air bypassing the heater core 9, so that the temperature of air to be discharged or blown-off from the duct 1 is controlled at a desired value. The duct 1 has at its downstream end a defroster outlet 12, a vent outlet 13 and a heat outlet 14 that are provided in branched fashion and all open to a vehicle compartment 15. Three mode doors 16a, 16b, 16c are disposed adjacent to the respective outlets 12-14 to open and close the outlets 12-14. The operation of the mode doors 16a -16c is controlled by an actuator 17 for selecting a desired mode of operation of the air-conditioner.

The evaporator 8 is connected in fluid circuit with the compressor 18, a condenser 19, a receiver tank 20, and an expansion valve 21 so as to constitute jointly therewith a refrigeration cycle or system.

Figure 3:
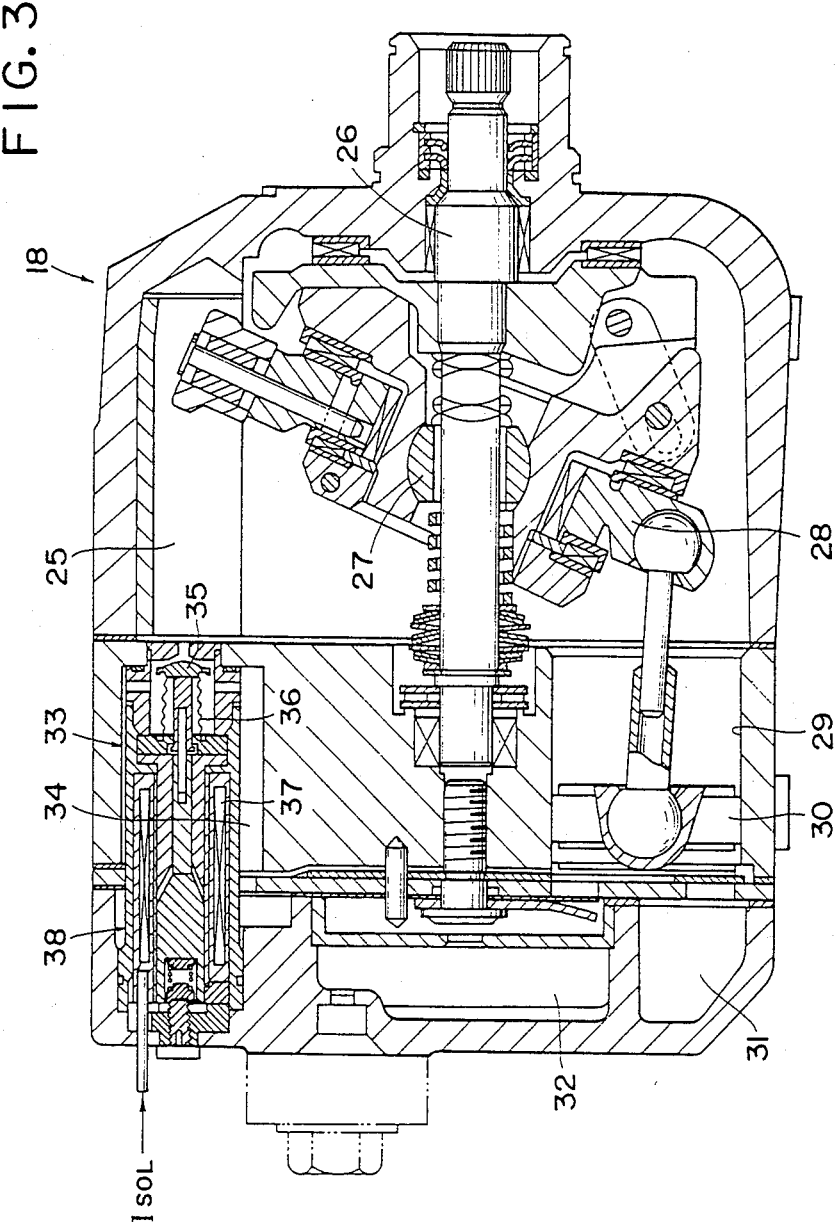
FIG. 3 is an enlarge longitudinal cross-sectional view of a compressor of the air-conditioner.

The compressor 18 is connected in driven relation to the engine 22 via an electromagnetic clutch 23. The compressor 18 includes the displacement adjustment means or mechanism 24 whose construction is known per se. When the compressor 18 is of the wobble or swash plate type, the displacement adjustment mechanism 24 is so constructed as to vary the amount of discharge gas flowing back to the intake side of the compressor, thereby regulating the displacement of the compressor. The wobble plate variable displacement compressor is described below with reference to FIG. 3.

The compressor 18 includes a wobble plate or swash plate 28 is movably supported within a crank chamber 25 and pivotally movable about a hinge ball 27 fitted over a drive shaft 26. The wobble plate 28 is connected with a plurality of pistons 30 slidably received in a plurality of cylinder bores 29, so that a refrigeration medium drawn from a low pressure chamber 31 is compressed in the respective cylinder bores 29 and then the compressed refrigeration medium is discharged from the cylinder bores 29 into a high pressure chamber 32 in response to reciprocating movement of the pistons 30. The displacement adjustment mechanism 24 comprising a pressure control valve 33 is disposed in the compressor 18 in confronting relation to the crank chamber 25. The pressure control valve 33 includes a valve element 35 movable for regulating the degree of communication between the crank chamber 25 and an intake chamber 34 which communicates with the low pressure chamber 31, a pressure responsive member 36 responsive to the pressure in the intake chamber 34 for displacing the valve element 35, and a solenoid 38 for forcibly displacing the valve element 35 to a controlled extent depending to the amount of electric current $I_{SOL}$ supplied to the solenoid 38.

With this construction, when the electric current supply to the solenoid 38 is increased to intensify the magnetizing force of the solenoid 38, the valve element 35 is urged in a direction to restrict the communication between the crank chamber 25 and the intake chamber 34, thereby reducing the amount of the refrigeration gas leaking from the crank chamber 25 to the intake chamber 34. With this restricted communication between the crank chamber 25 and the intake chamber 34, the refrigeration gas is caused to leak to the crank chamber 25 through a clearance between each piston 30 and the corresponding cylinder bore 29, thereby increasing the pressure in the crank chamber 25. Since the pressure acting on the back to the respective piston 30 increases as the pressure in the crank chamber 25 is increased due to the blow-by gas, the wobble plate 28 is caused to pivot about the hinge ball 27 in a direction to reduce the angle of oscillation thereof. As a consequence of this pivotal movement, the stroke of the pistons 30 and hence the displacement of the compressor 18 is reduced.

As shown in FIG. 2, the actuators 6, 11, 17, a motor of the blower 7, the electric clutch 23 of the compressor 8, and the displacement adjustment means 24 are connected to a microcomputer 41 through respective drive circuits 40a -40f and they are controlled by output control signals from the microcomputer 41. The microcomputer 41 is of the conventional type known per se and comprises a central processing unit (CPU), a read only memory (ROM), a random access memory (RAM) and an input/output port (I/0), neither shown. The vehicle compartment temperature $T_R$ detected by a vehicle compartment temperature sensor 42, the outside air temperature $T_A$ detected by an outside air temperature sensor 43, and the temperature of air $T_{IN}$ before being passed through the evaporator 8 detected by an intake air temperature sensor 44 disposed upstream of the evaporator 8 are inputted through a multiplexer (MPX) 45 to an A/D converter 46 in the order selected by the multiplexer 45. After having been converted into digital signals by the A/D converter 46, the digital signals are delivered to a microcomputer 41.

The microcomputer 41 is also supplied with output signals from an instrument panel 47. The instrument panel 47 is provided with a series of manual switches 48a -48d for selectively changing the rotational speed of the blower 7 between a succession of low (LOW), medium (MED), high (HI) and a maximum high (MAX HI) levels, an automatic switch (AUTO) 48e for automatically controlling the rotational speed of the blower 7, an off switch (OFF) 48f for stopping the operation of the blower 7, a start switch (A/C) 49 for starting the compressor 18, a changeover switch 50 for selecting the recirculated air or the outside air to be introduced into the duct 1, four mode switches 51a –51d for selecting a discharge mode of the blow-off air, and a temperature setter 52.

The temperature setter 52 is composed of an up-down switch 52a and a display unit 52b associated therewith for indicating a setting temperature $T_D$. The up-down switch 52a is actuated to vary the setting temperature within a predetermined range. The temperature setter 52 may be of the type having a slidable temperature setting lever adapted to be manually actuated for adjustably setting the desired or target temperature.

Figure 4:
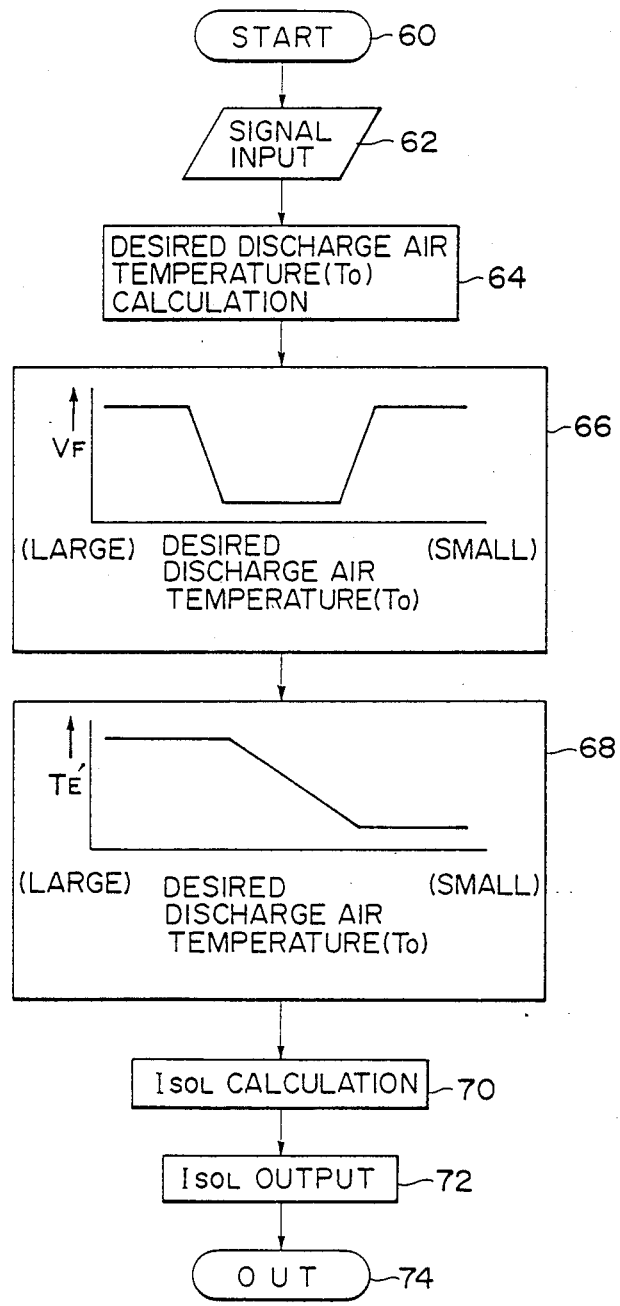
FIG. 4 is a flowchart showing a control routine achieved by a microcomputer incorporated in the air-conditioner.

The operation of the microcomputer 41 will be described below with reference to a flowchart shown in FIG. 4. The control routine of the microcomputer 41 starts in a step 60 in accordance with a program stored in the microcomputer 41. In the next step 62, various signals from the vehicle compartment sensor 42, the outside temperature sensor 43, the intake air temperature sensor 44 and the instrument panel 47 are inputted into the microcomputer 33. Thereafter, based on the thus-inputted signals, a desired temperature $T_0$ of air to be discharged into the vehicle compartment is calculated in a step 64 in accordance with the following equation.

$$T_0 = K_1 \cdot R_D + K_2 \cdot T_R - K_3 \cdot T_A + C_1$$

where $K_1$, $K_2$, $K_3$, $K_4$ and $C_1$ are constants.

When the value $T_0$ is small, this indicates that the refrigeration loads are large. Conversely, the larger the value $T_0$, the larger the heating loads.

After calculation of the desired discharge air temperature $T_0$ in the step 64, the control goes to a step 66 in which a desired flow quantity of air to be supplied to the vehicle compartment is obtained, in the form of an electric voltage $V_F$ to be applied to the motor of the blower 7, from a control pattern which is predetermined with reference to a correlation to the desired discharge air temperature $T_0$. According to the predetermined control pattern, the flow quantity of air to be supplied to the vehicle compartment is set at a large value when the refrigeration loads or the heating loads are large, while it is set at a small value when the refrigeration loads or the heating loads are small. Then, a desired cooling degree $T_E'$ of the evaporator 8 is set in a step 68 based on a control pattern which is predetermined with reference to a correlation to the desired discharge air temperature $T_0$. According to the predetermined control pattern, the desired cooling degree $T_E'$ is set at a small vale when the refrigeration loads are large while it is set at a large value when the heating loads are large.

The predetermined control patterns described with respect to the respective steps 66, 68 are stored in the ROM of the microcomputer 41 and used for reading out the $V_F$ and $T_E'$, respectively, corresponding to $T_0$.

Thereafter, the control goes to a step 70 in which the quantity of an electric current $I_{SOL}$ to be supplied to an excitation coil 37 (FIG. 3) of the pressure control valve 33 is calculated based on the voltage $V_F$ applied to the motor of the blower 7 and the desired cooling degree $T_E'$ of the evaporator 8 that are determined in the steps 66 and 68, respectively. The calculation of $I_{SOL}$ is carried out in the order described below, with the use of prescribed performance curves or patterns, for example, shown in FIG. 5 stored in the microcomputer 41.

Figure 5:
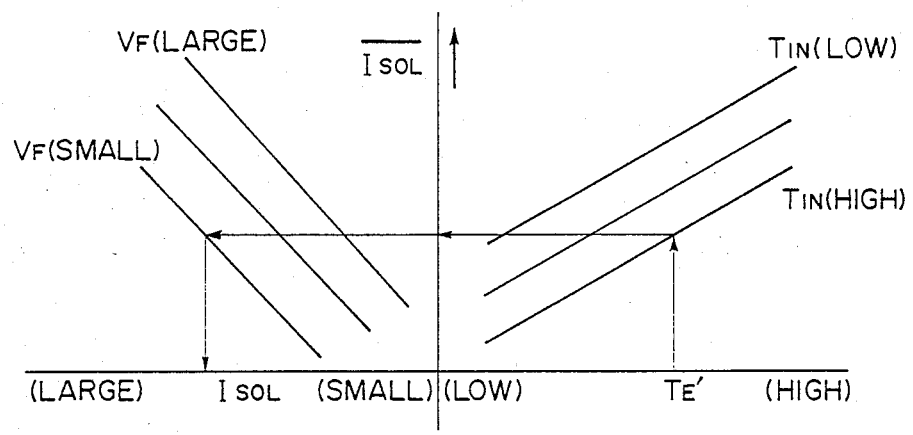
FIG. 5 is a graphic representation of performance curves used for determination of the amount of adjustment of a displacement adjustment mechanism based on a desired degree of cooling of an evaporator, a temperature of intake air, and an amount of intake air.

At first, a temporary quantity of electric current $\overline{I_{SOL}}$ is obtained from a pattern presented on the right side of the vertical axis shown in FIG. 5, based on the desired cooling degree $T_E'$ and the intake air temperature $T_{IN}$. Since the thermal loads on the evaporator 8 are reduced with a reduction of the intake air temperature $T_{IN}$ even when the desired cooling degree $T_E'$ is set at the same value, the performance curve taken at a lower $T_{IN}$ value is set above the performance curve taken at a larger $T_{IN}$ value. With the thus arranged performance curves for $T_{IN}$ when the thermal loads on the evaporator 8 are reduced, the $\overline{I_{SOL}}$ is set at a large value, thereby reducing the displacement of the compressor 18. The performance curves for $T_{In}$ incline rightwardly upwardly so as to increase the $\overline{I_{SOL}}$ with the $T_E'$ even when the $T_{In}$ has the same value. After determination of $\overline{I_{SOL}}$ then an actual quantity of electric current $I_{SOL}$ to be supplied to the exciting coil 37 is obtained from a pattern presented on the left side of the vertical axis of FIG. 5, based on the $\overline{I_{SOL}}$ and the voltage $V_F$ applied to the motor of the blower 7. Since the thermal loads on the evaporator 8 are reduced with a reduction of the voltage $V_F$ even when the $\overline{I_{SOL}}$ has the same value, the performance curve taken at a lower $V_F$ is set below the performance curve taken at a larger $V_F$ value. With the thus arranged performance curves for $V_F$ when the thermal loads on the evaporator 8 are reduced, the $I_{SOL}$ is set at a large value, thereby reducing the displacement of the compressor 18. The performance curves for $V_F$ incline leftwardly upwardly so as to increase the $\overline{I_{SOL}}$ with the $I_{SOL}$ even when $V_F$ has the same value. The performance curves of $T_{In}$ and $V_F$ are experimentally determined.

After calculation of the $I_{SOL}$ the control proceeds to a step 72 for supplying an electric current equal in amount to $I_{SOL}$ to the excitation coil 37 through the driver circuit 40f. Thereafter, the control goes to another control routine through a step 74.

With the control thus described, the $I_{SOL}$ is varied in direct and immediate response to a change in the thermal loads on the evaporator 8 caused by a change in the temperature of intake air or a change in the quantity of air supplied from the blower.

Obviously, various modifications and variations of the present invention are possible in the light of the above teaching. It is therefore to be understood that within the scope of the appended claims the present invention may be practiced otherwise than as specifically described.

What is claimed is:

1. An air-conditioner for an automobile, comprising:
   (a) a refrigeration cycle including an evaporator through which intake air is forced to pass, and a compressor adapted to be driven by an engine of the automobile;
   (b) an intake air temperature sensor for detecting the temperature of intake air before being passed through said evaporator;
   (c) displacement adjustment means for regulating the displacement of said compressor;
   (d) desired discharge temperature calculation means for calculating a desired temperature of air discharged into a vehicle compartment of the automobile based on the outputs from at least a temperature setter and a vehicle compartment temperature sensor:
   (e) desired cooling degree calculation means for calculating a desired degree of cooling of said evaporator based on the result of calculation by said desired discharge temperature calculation means;

(f) desired rotational speed calculation means for calculating a desired rotational speed of a blower based on the result of calculation by said desired discharge temperature calculation means; and (g) control means for calculating an amount of adjustment of said displacement adjustment means based on the output from said intake air temperature sensor, the result of calculation by said desired cooling degree calculation means and the result of calculation by said desired rotational speed calculation means.

2. An air-conditioner according to claim 1, said displacement adjustment means including a pressure control valve having pressure responsive member disposed facing a hole intercommunicating a low pressure chamber of said compressor and a crank chamber of said compressor, a valve element movably driven by said pressure responsive member for adjustably changing the opening of said hole, and a solenoid for controlling the movement of said valve element depending on the amount of an electric current supplied thereto.

3. An air-conditioner according to claim 2, said solenoid being operative to urge said valve member in a direction to gradually restricting fluid communication between said low pressure chamber and said crank chamber substantially in direct proportional to the amount of said electric current supply.

* * * * *